United States Patent [19]
Loeb

[11] 4,283,913
[45] Aug. 18, 1981

[54] UTILIZATION OF SATURATED SOLAR PONDS

[75] Inventor: Sidney Loeb, Omer, Israel

[73] Assignee: Intertechnology/Solar Corporation, Warrenton, Va.

[21] Appl. No.: 968,792

[22] Filed: Dec. 12, 1978

[51] Int. Cl.³ .............................................. F03G 7/06
[52] U.S. Cl. .................................. 60/641 A; 60/649; 60/673; 60/721; 126/415; 126/452
[58] Field of Search ................ 60/641, 649, 673, 721; 126/415, 452

[56] References Cited

U.S. PATENT DOCUMENTS

| | | | |
|---|---|---|---|
| 3,372,691 | 3/1968 | Schachar | 126/452 |
| 3,587,227 | 6/1971 | Weingarten | 60/721 X |
| 3,906,250 | 9/1975 | Loeb | 60/673 X |
| 3,978,344 | 8/1976 | Jellinek | 60/673 X |

*Primary Examiner*—Allen M. Ostrager

[57] ABSTRACT

A saturated non-convective solar pond is employed as an unmixing device in conjunction with reverse electrodialysis or pressure-retarded osmosis for power generation.

16 Claims, 6 Drawing Figures

UTILIZATION OF SATURATED SOLAR PONDS

BACKGROUND OF THE INVENTION

The invention relates to membrane heat engines utilizing a saturated solar pond as an unmixing device in the generation of power from the mixing of a dilute and concentrated solution through either a pressure-retarded osmosis (PRO) permeator, or by reverse electrodialysis (RED) permeator. Both the PRO permeator and the RED permeator are, of themselves, known, and saturated solar ponds are also known. All of them are today experimental and developmental, not having reached the stage of successful commercial exploitation. For example, in U.S. Pat. No. 3,906,250 to Loeb, are described various pressure-retarded osmosis heat engines. One variation shows a solar pond, (no reference to saturation), used as a heat source only, rather than as an unmixing device. At another point, thermal unmixing by use of a solute whose solubility is a function of temperature is disclosed, but reference is to filtration of a precipitated solute, i.e., not unmixing completely in liquid phase as described herein.

Reverse Electrodialysis or the Dialytic Battery has been disclosed in numerous publications, Weinstein & Leitz *Science* 191, 557 (1976); Energy by Reverse Electrodialysis, S.R.I. report to D.O.E. (1978). All of these prior disclosures have assumed an open system with fresh water and brine input, a discharge and no recirculation.

In obtaining useful power from PRO, potential energy is obtained by the permeation of a solvent, such as water, into a pressurized brine solution, such as one of ordinary salt, thereby increasing the volume of the brine solution under pressure. The resultant increased volume under pressure may be employed to do useful work and thereby derive energy from the unmixing. In RED, electrical energy is obtained directly due to the transport of cations or anions through membranes permeable to either one or the other ion. Electrodes are then employed in different chambers to connect the resultant electrical current to an external circuit to perform useful work.

The saturated solar pond, as described in U.S. patent application Ser. No. 958,037 filed Nov. 6, 1978, entitled "Solar Collection System," has the interesting characteristic, as an unmixing device, that it uses unfocused solar energy to divide a spent solution into a concentrated and dilute solution. Furthermore, it accomplishes this unmixing without precipitation. It combines within itself the function of a heat source, heat sink, and unmixer. Thus the saturated solar pond (SSP), when used together with a membrane permeator and attendant equipment, comprises a novel heat engine for efficient production of useful energy from low grade solar energy.

SUMMARY OF INVENTION

According to part of the invention, a solar energy collection system comprises a non-convecting saturated solar pond which, by definition, is capable of partially unmixing the solution without any change of phase. The portion with more concentrated solute and the portion with less concentrated solute are then received by or flow into two chambers separated by a semi-permeable membrane in PRO or by an ion-selective membrane in RED. As a result of permeation through the membrane and the resultant mixing, at least part of the free energy of mixing is converted to useful energy. The used solution is then returned to the pond for unmixing.

In the case of both RED and PRO, solutions emerging from both chambers are sent to the saturated solar pond for unmixing. The subsequently obtained less concentrated solution may be supplied to the low concentration chamber from the standard solar pond after being warmed by a heat exchanger in order to reduce or eliminate undesired precipitation in the chambers.

DESCRIPTION OF THE DRAWINGS

The various objects, advantages, and novel features will be more fully apparent from the following detailed description in which.

DETAILED DESCRIPTION

Figure 1:
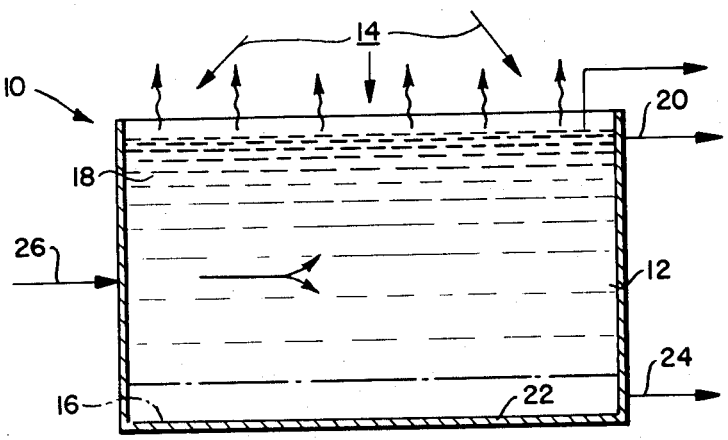
FIG. 1 is a schematic diagram illustrating a saturated, non-convective solar pond.

The saturated solar pond is shown in FIG. 1, preferably may contain a brine of borax. The pond is cooled at the top by conduction, convection, and evaporation losses to ambient air, and at night by radiation to the sky. The pond is heated at the bottom by absorption of solar energy on a black surface or other good absorber of solar energy. Thus a temperature gradient is created from top to bottom of the pond. A brine introduced at one end contains a salt, such as borax, whose solubility increases with temperature.

Under these conditions, and if sufficient appropriate salt is used to achieve saturation at every level of the pond, temperature, concentration, and density gradients will be established such that cool, dilute, and low density brine can be removed from the top while hot, concentrated, and high density brine can be removed from the bottom.

Figure 2:
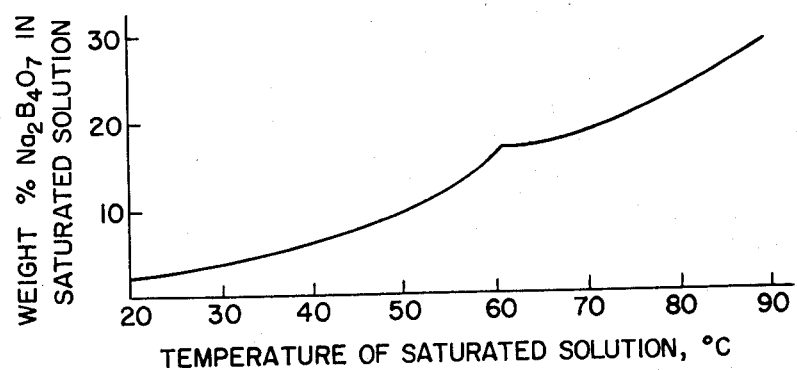
FIG. 2 is a curve of weight percent of borax in saturated solution as ordinates plotted against the temperature of a saturated solution in degrees centigrade as abscissa.
Figure 3:
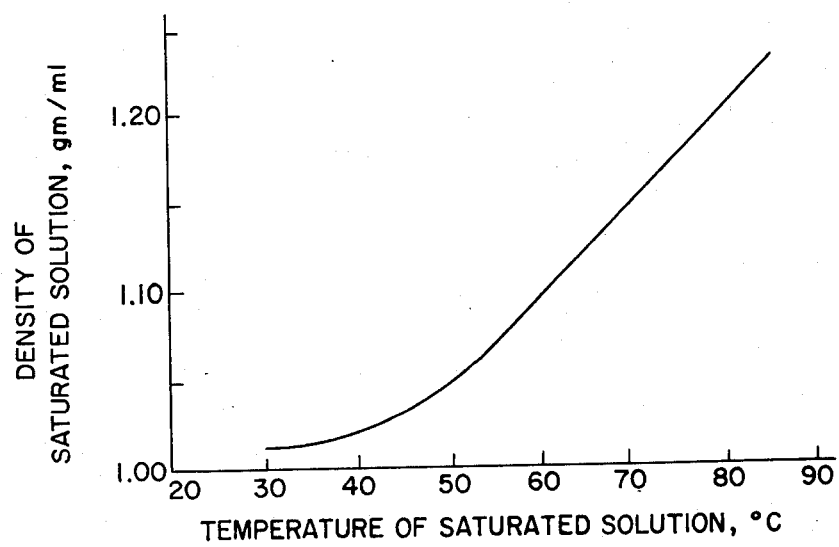
FIG. 3 is a plot of density of a saturated solution, in grams per milliliter as ordinates against the temperature of a saturated solution in degrees centigrade as abscissas.
Figure 4:
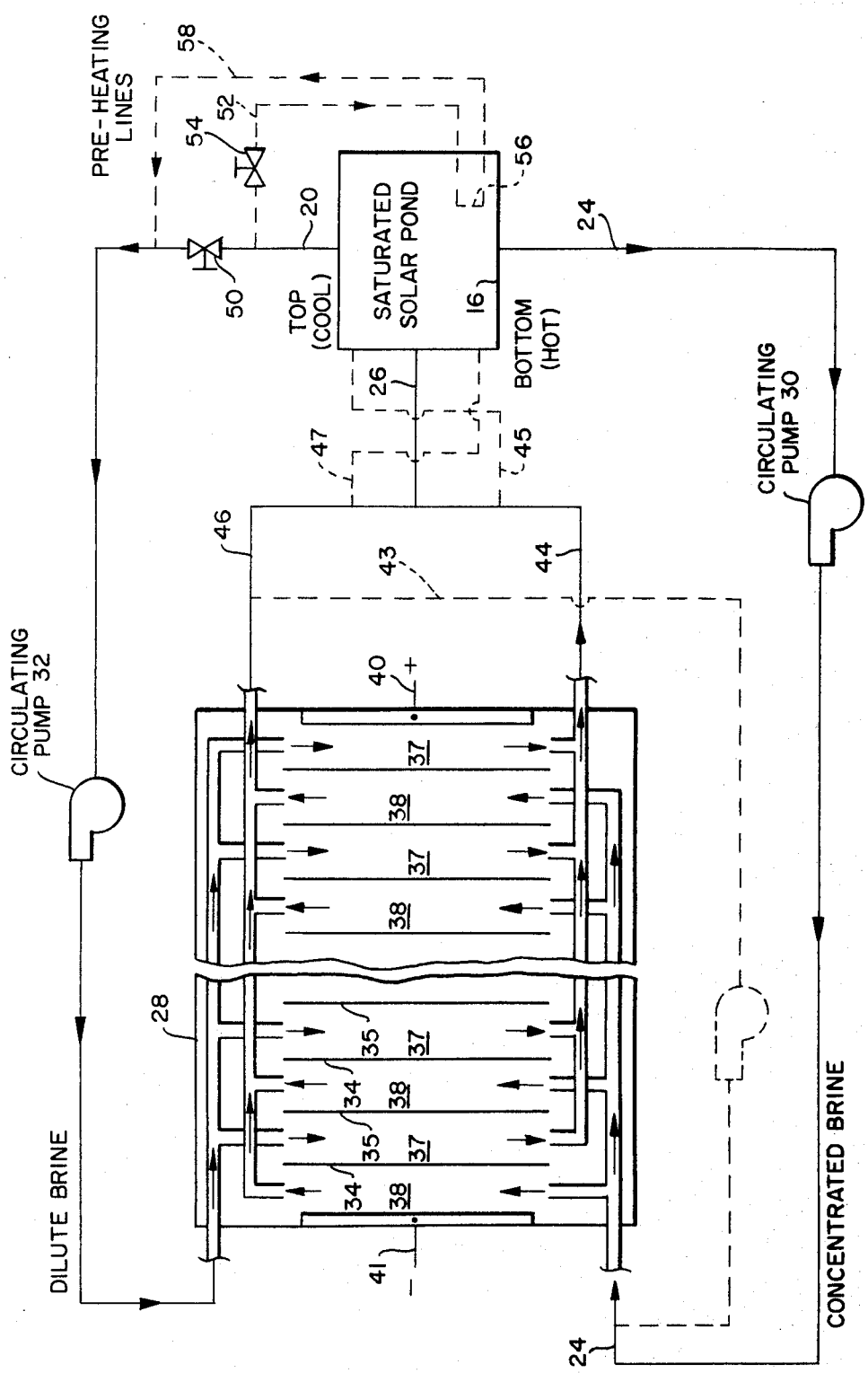
FIG. 4 is a schematic diagram of an embodiment of the invention employing reverse electrodialysis to convert the energy of mixing.

The operation of the saturated, non-convection solar pond of FIG. 1 will be better understood after considering FIGS. 2, 3 and 4. FIG. 2 shows the weight percentage of borax in terms of the anhydrous solute ($Na_2B_4O_7$) in saturated solution increases from a few percent to approximately 25% continuously with temperature. FIG. 3 indicates that the density of the saturated solution increases continuously with temperature from about 1.01 to over 1.2 and near 1.25 from about 30° C. to about 80° C. It is therefore apparent that as the solute in the saturated solution in the lower levels of the pond 10 tends to rise by diffusion it will approach a cooler layer and tend to precipitate. The precipitate returns to the lower layers and redissolves. Therefore, the entire pond is maintained in a saturated condition. The most dilute solutions may be withdrawn through pipe 20 and most concentrated solution through pipe 24, and after the energy of unmixing has been converted to useful energy in a manner to be described, the spent brine may be returned via the pipe 26 to the saturated, non-convecting pond 10. Depending on the solute chosen, an impermeable layer may or may not be needed to prevent the atmospheric gases from altering the composition of the solution.

Reverse-electrodialysis (RED) is shown in FIG. 4. RED must be operated with an electrolytic brine while pressure retarded osmosis (PRO) can also work with a nonelectrolyte solution.

The concentrated brine in line 24 enters alternate fingers of chamber 38 in parallel streams and exits each chamber through line 46. The dilute brine enters alternate fingers of chamber 37 which are interleaved in parallel streams and exits each chamber in line 44. Between the fingers of chambers 37 and 38 are alternately membranes 34 and 35. One membrane, 34, is selectively permeable to anions and the other membrane, 35, is selectively permeable to cations. Suitable membranes appear to be the AV-3T and CL-2.5T of Tokuyama Soda Co.

The diffusion is from the concentrated brine fingers or chambers 38 into the two adjoining dilute brine fingers or chambers 37. The anions will flow one chamber to the right through membranes 34 and the cations one chamber to the left through membranes 35. The concentrated brine chamber 38 and the two membranes 34 and 35 forming its sides may be viewed as a membrane pair.

For all of the interior membrane pairs, the flow of cations and anions from adjoining membrane pairs to the dilute brine chambers 37 separating them will be the equivalent of a flow of the borax salt from chamber 38 to chamber 37. At the ends, one chamber will evolve hydrogen and the other will evolve oxygen as the cation forms a base and the anion forms an acid.

Also in the end chambers 37, 38, are electrodes 40, 41. A voltage is produced across each of the membranes as the anions and cations permeate. The membrane pairs therefore serve to insulate adjacent chambers of dilute brine and hold them at different potentials. There will be some voltage leak caused by the electrical path through the pipes. This can be minimized by increasing the length of the pipes, decreasing the cross section, and other well known techniques. The net effect is a transport of electric current around the external loop and a generation of voltage proportional to the number of pairs of membrane pairs.

The two brines exit in pipes 46 and 44 at 22% and 10% respectively. Rather than mixing them prior to reintroduction to the pond, they may be reintroduced in separate streams at the point of their approximate concentration. This would save the work done in the initial phase of unmixing.

The arrangement of FIG. 4 is intended to produce one kilowatt of useful power using borax as a solute. To this end, the solar pond is designed to provide approximately 370 square meters of black, absorbing radiation-receiving bottom area 16. After the pond has arrived at substantially stable conditions, the cool top portion will be at about 35° C. and the lower portion at about 90° C. It is estimated that the borax separation rate in the pond and the permeation rate in the permeator will be at about 5.5 metric tons per day. The estimated concentration of borax will be about 29% in the lower, hot portion of pond 22, and about 5% in the upper, cool portion of the pond. The voltage drop across a membrane will be approximately equal to the logarithmic ratio:

$$e = K \log c/d$$

where c is the concentration of brine in the hot solution and d is the concentration of brine in the dilute solution. Since borax has this high ratio of nearly 6 to 1 at the available temperatures, it appears at present to be the best suited. It is intended that there be approximately 1,000 membrane pairs, each pair consisting of a cation and anion exchange membrane respectively. For each membrane pair the area of the two membranes exposed to permeation is approximately 1 square meter each, and the area resistance of each membrane is approximately 2 ohm cm$^2$ with an average permselectivity of about 0.64. The useful power should approximate one kilowatt after substracting about one-half kilowatt used by the two circulating pumps.

One of the difficulties with this kind of system is that the cool dilute brine drawn from pond 10 through the pipe 20, tends to precipitate the hot brine drawn through the pipe 24 when these brines enter the RED permeator 28. Such precipitation is undesirable because it tends to clog the permeation membranes and also deposits on the walls of the chambers thereby destroying the desired effect of the changes in concentration, and further involves changes of phase which do not contribute usefully to the desired energy and involve waste. Accordingly, a valve 50 may be inserted in the conduit 20. A liquid line or conduit 52 with an interposed valve 54 is joined at a junction to the line 20 on the pond side of the valve 50. The line 52 passes through a heat exchange device such as a coil 56 in the warmer part of the pond 10 near the hot bottom layer 22 and then continues as a conduit 58 to connect with the line 20 on the side of the valve 50 remote from the pond 10.

In this way as desired either continuously or periodically, the valve 50 may be closed and the valve 54 opened. As the circulating pump 32 operates, the lower concentration solution from the upper portion of the pond 10 is passed through the heat exchange coil 56 which therefore warms it and tends to increase the temperature level in the RED permeator. This higher temperature level tends to dissolve precipitate by virtue of the more unsaturated condition of the two brines.

A second method of controlling the precipitation problem in the concentrated brine chambers 38 is to recirculate a portion of the brine from pipe 46, through pipe 43 back into pipe 24 and then back into chambers 38. This dilutes the brine, bringing it below its saturation point and avoiding any precipitation due to thermal contact with the dilute cool brine.

The relative mass circulation in the different conduits in FIG. 4 may be calculated approximately as follows; in conduit 24 and circulated by pump 30, a mass of about 11; in conduit 20 and circulated by pump 34, a mass of about 24; the spent brine circulated in conduit 26 should be about 35. In other words, roughly 70% of the liquid is circulated through pump 30 and a little less than 30% through pump 32, substantially the total circulation passing through the conduit 26. The absolute values of flow may be calculated, for the RED permeator described, using mass 1 equalling 5.5 metric tons per day.

Figure 5:
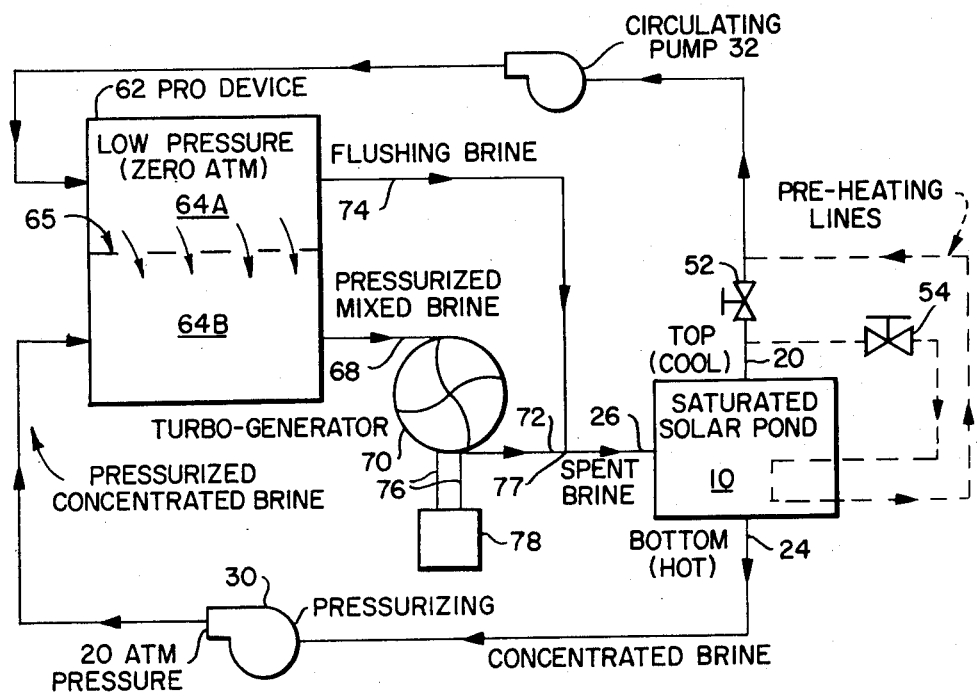
FIG. 5 is a schematic diagram of an embodiment of the invention employing reverse-pressure osmosis to convert the energy of mixing.

Referring to FIG. 5, the pond 10, the conduit 24 and 20 and the pumps 30 (with a minor difference) and 32 may be as heretofore described. In the embodiment of FIG. 5, the liquid from the unmixed portion with a lower solute concentration from the pump 32 is pumped to the low pressure side of a PRO device 62, while the liquid from the unmixed portion of the greater solute concentration is pumped by pump 30 to the high pressure side of PRO device 62. The PRO device 62 comprises a pair of chambers 64A and 64B which are separated by semi-permeable membranes arranged in a suitable geometry such as the DuPont Permasep hollow fiber permeator. Three B-9 Permasep permeators, each containing about 150 square meters of membrane surface would be adequate for net production of one kilowatt of power. In this case the chambers are hermetically sealed. The water permeates by osmotic action from the low pressure chamber 64A of the lower concentration solute into the higher concentration solute in chamber 64B at the higher hydraulic pressure. The resultant mixed solution emerging from compartment 64B at increased volume and approximately the same hydraulic pressure, is fed to a conduit 68 and thence to a turbo generator 70 from which the effluent exits by a conduit 72. The effluent conduit 72 is joined at a junction 77 by a volume of exiting flushing solution at a low concentration drawn from the chamber 64A through a conduit 74. From the junction, the spent solution passes into a conduit or pipe 26. The turbo generator produces electrical current supplied by generator 78 from whence the power may be distributed to the pumps 30 and 32 and to a useful load.

Figure 6:
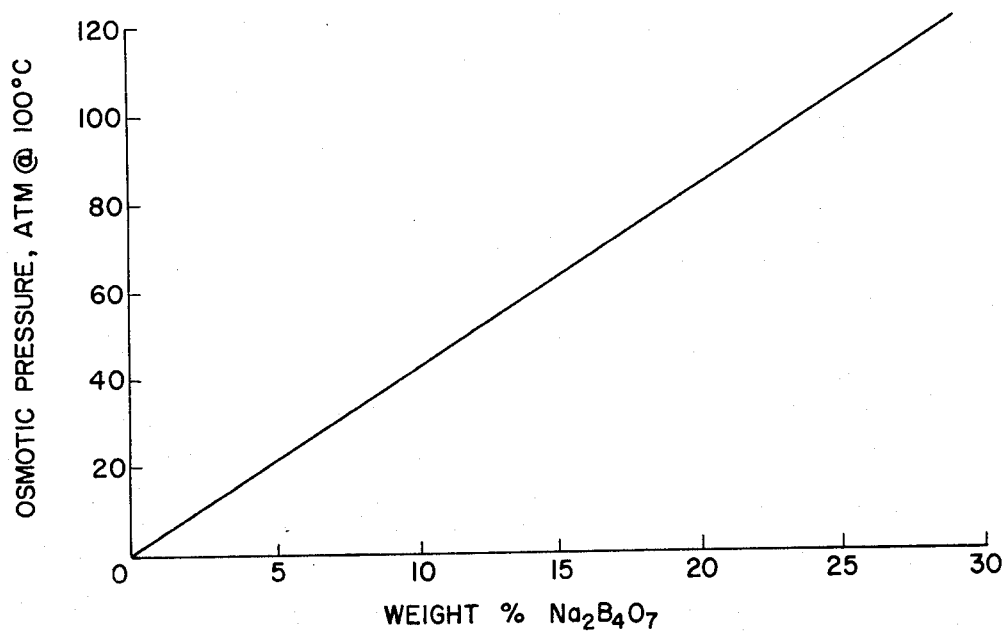
FIG. 6 is a graph of osmotic pressure, in atmospheres, at 100° C. as ordinate plotted against the weight percent of borax as ($Na_2B_4O_7$) as abscissa.

In PRO the driving force is proportional to the difference between the concentration of the concentrated and dilute solution. For borax this is large, making it more attractive than some other cheaper brines. Referring to FIG. 6, the graph indicates the approximate osmotic pressure in atmospheres against weight percent of dehydrated borax. The weight percent of dehydrated borax in solution in conduit 24 is about 29% and that in conduit 20 is about 5%. Consequently, we may assume an initial osmotic pressure difference across the membrane of well over 100 atmospheres. In operation the hydraulic pressure differential is 20 atmospheres, which is less than the osmotic pressure difference as required in PRO.

It is estimated for the embodiment for FIG. 5, the pond may have approximately 260 square meters of radiation absorbing surface. The pump 30 in the embodiment of FIG. 5 is a pump which should produce adequate flow at approximately 20 atmospheres of pressure at its output. The high pressure chamber 64B may be at about 20 atmospheres of pressure, and the chamber 64A may be at about one atmosphere of pressure. It is estimated that the turbo generator will produce approximately 1.1 kilowatts to power the pumps and approximately 1 kilowatt of useful energy to a suitable load.

In the embodiment of FIGS. 4 and 5 the valve 50 may be closed and the valve 54 opened in order to supply a warmer flow of low temperature, less concentrated solution through the circulation pump 32 and through the low pressure chamber 64A in order to flush the solution in the low pressure chamber and tend to dissolve any salts which may have precipitated or which might precipitate, in this case in the low pressure, low concentration chamber 64A. Such precipitation would tend to clog the semi-permeable membrane 65 and adversely effect the flow of permeate, which in this instance is water.

For the embodiment of FIG. 5, it is estimated that for every unit volume of concentrated brine which is pumped from the pond by pump 30, approximately one and a half units of volumes of liquid will be pumped by the pump 32 and that a half unit of volume may be used as flushing brine or solution which will flow through the conduit 74 for a corresponding two volumes of solution which will be supplied to the PRO generator. The unit of volume used for the generator disclosed in FIG. 5 is 80 m³/day of permeate.

Roughly 30% borax by weight will be carried through the conduit 24 by pump 30 and approximately 5% by weight through pump 32, both estimated on the basis of anhydrous borax. The mixed brine or solution which is received by conduit 68 is approximately 15% by weight borax whereas the flushing solution is approximately 12% by weight borax. The spent brine therefore being approximately in the range of 12 to 15% by weight of anhydrous borax as it is supplied from the intermediate tube 26 to the pond 10.

Although the present invention has been described with reference to a particular embodiment thereof, it should be understood that those skilled in the art may make many other modifications and embodiments thereof which will fall within the spirit and scope of the principles of this invention.

What is claimed as new and desired to be secured by patent of the United States is:

1. A system comprising in combination a saturated solar pond containing a saturated solution of brine, said solution and pond arranged to receive solar radiation to unmix a solution fed into said pond into a saturated solution varying continuously from a higher, cooler, dilute solution to a lower, hotter, concentrated solution, means to withdraw said dilute solution, separate means to withdraw said concentrated solution, means thereafter to mix the two withdrawn solutions during the course of any useful operation and to reintroduce the mixed solution to the pond.

2. The system of claim 1 including an energy conversion device powered by said solutions of different concentrations.

3. A system to generate electric power from solar energy comprising in combination:
    (a) a saturated solar pond, containing a saturated solution of a brine, said solution and pond arranged to receive solar radiation to unmix said saturated solution continuously varying from a higher, cooler, dilute solution to a lower, hotter, concentrated solution;
    (b) an energy conversion device having at least a first and second chamber, said first chamber connected to said dilute solution and said second chamber connected to said concentrated solution;
    (c) said first and second chambers separated by two membranes, said first membrane occupying a first portion of the space separating said chambers, said second membrane occupying the remaining portion of the space separating said chambers;
    (d) said first membrane selectively permeable to anions and said second membrane selectively permeable to cations, whereby the anions and the cations in the concentrated brine chamber permeate to the dilute brine chamber creating an electrical potential;
    (e) means responsive to said generated electrical potential to generate electric power;
    (f) Means to return said altered solutions to said saturated solar pond for unmixing.

4. The combination of claim 3 including means to heat said dilute liquid withdrawn from the top of the pond before receipt in the first chamber, by heat exchange between said dilute liquid and the concentrated liquid at the bottom of said pond.

5. The combination of claim 3 wherein the solute consists essentially of borax and the solvent consists essentially of water.

6. A system to generate power for solar energy comprising in combination:
  (a) a saturated solar pond, containing a saturated solution of a brine, said solution and pond arranged to receive solar radiation to unmix said saturated solution continuously varying from a higher, cooler, dilute solution to a lower, hotter, concentrated solution;
  (b) an energy conversion device having a first and second chamber, said first chamber connected to said dilute solution and said second chamber at high hydraulic pressure connected to said concentrated solution;
  (c) said first and second chambers separated by a membrane which is preferentially permeable to the solvent of the solution thus enhancing the volume of pressurized solution within the second chamber containing the concentrated solution and altering the concentration of both solutions;
  (d) means responsive to said enhanced volume of pressurized solution to generate power, and,
  (e) means to return said altered solutions to said saturated solar pond for unmixing.

7. The combination of claim 6 in which the energy conversion device powers an electrical generator.

8. The combination of claim 6 in which the energy conversion device powers a pump.

9. The combination of claim 6 including means to heat said dilute liquid withdrawn from the top of the pond before receipt in the first chamber, by heat exchange between said dilute liquid and the concentrated liquid at the bottom of said pond.

10. The combination of claim 6 wherein the solute consists essentially of borax and the solvent consists essentially of water.

11. A method of generating power from solar power comprising:
  (a) absorbing said solar energy in a solar pond, said solar pond containing a solvent and a solute, said solute being more soluble in a hotter solution, whereby said solar pond is saturated;
  (b) said solar pond unmixing said saturated solution into a higher, cooler, dilute solution varying continuously to a lower, hotter, concentrated solution;
  (c) supplying a portion of said dilute solution to a series of parallel chambers of an energy conversion device;
  (d) supplying a portion of said concentrated solution to a second series of parallel chambers of said energy conversion device, said first series of chambers separating said second series of chambers, each of said chambers being separated from the next by an ion permeable membrane, each chamber having an anion-selective membrane on one side and a cation-selective membrane on the other side;
  (f) the cations and anions from said concentrated brine permeating said membrane and creating an electrical potential across said membrane;
  (g) returning said brine streams having altered concentrations to said pond whereby an electrical current is generated across said chambers.

12. The method of claim 11 including heating said dilute liquid withdrawn from said pond by heat exchange with said hotter concentrated liquid.

13. The method of claim 11 wherein the solute consists essentially of borax and the solvent consists essentially of water.

14. A method of generating power from solar power comprising:
  (a) absorbing said solar energy in a solar pond, said solar pond containing a solvent and a solute, said solute being more soluble in a hotter solution, and said solar pond containing an excess of solute whereby said solar pond is saturated;
  (b) said solar pond unmixing said saturated solution into a higher, cooler, dilute solution, varying continuously to a lower, hotter, concentrated solution;
  (c) supplying a portion of said dilute solution to a first chamber of an energy conversion device, said chamber having a low hydraulic pressure;
  (d) supplying a portion of said concentrated solution to a second chamber of said energy conversion device, said chamber having a high hydraulic pressure;
  (e) said two chambers separated by a membrane selectively permeable to said solvent;
  (f) permeating the solvent from said dilute solution to said concentrated solution thereby enhancing the volume of pressurized solution within said second chamber, and,
  (g) generating power by means responsive to said enhanced pressurized volume.

15. The method of claim 14 including heating said dilute liquid withdrawn from said pond by heat exchange with said hotter, concentrated liquid.

16. The method of claim 14 wherein the solute consists essentially of borax and the solvent consists essentially of water.

* * * * *